US012394291B2

(12) United States Patent
Reynolds

(10) Patent No.: US 12,394,291 B2
(45) Date of Patent: Aug. 19, 2025

(54) DEVICES, SYSTEMS, AND METHODS TO REDUCE INCIDENTS OF THEFT OF MULTIFUNCTION DISPLAYS

(71) Applicant: Robert Reynolds, Bradenton, FL (US)

(72) Inventor: Robert Reynolds, Bradenton, FL (US)

( * ) Notice: Subject to any disclaimer, the term of this patent is extended or adjusted under 35 U.S.C. 154(b) by 238 days.

(21) Appl. No.: 18/213,003

(22) Filed: Jun. 22, 2023

(65) Prior Publication Data

US 2024/0029530 A1 Jan. 25, 2024

Related U.S. Application Data

(60) Provisional application No. 63/354,481, filed on Jun. 22, 2022.

(51) Int. Cl.
*G08B 13/22* (2006.01)

(52) U.S. Cl.
CPC .................................... *G08B 13/22* (2013.01)

(58) Field of Classification Search
CPC .... G08B 13/22; G08B 13/149; B60R 25/002; B60R 25/01; B60R 2325/202; B60R 2325/205; B60R 2325/304; B60R 25/2018; B60R 2011/0005; B60R 2011/0007; B60R 2011/0003; G06F 21/88; B63B 2017/0009
See application file for complete search history.

(56) References Cited

U.S. PATENT DOCUMENTS

| | | | | | |
|---|---|---|---|---|---|
| 3,836,007 | A * | 9/1974 | Rosenwein | A47F 7/021 | 116/75 |
| 4,584,717 | A * | 4/1986 | Strickland | B60R 11/00 | 360/137 |
| 4,706,810 | A * | 11/1987 | Petrilli | B63B 49/00 | 296/70 |
| 5,104,071 | A * | 4/1992 | Kowalski | B60R 11/0205 | 455/345 |
| 5,537,673 | A * | 7/1996 | Nagashima | H04M 1/6075 | 455/74 |
| 6,879,961 | B1 * | 4/2005 | Pathirana | A47F 10/00 | 705/16 |
| 7,104,851 | B1 * | 9/2006 | Gonring | B63J 99/00 | 340/5.31 |
| 7,385,508 | B1 * | 6/2008 | Ray | G08B 13/149 | 340/568.1 |
| 8,676,402 | B1 * | 3/2014 | Foster | B63C 15/00 | 701/2 |
| 9,346,414 | B1 * | 5/2016 | Kuhens | B60R 11/0258 | |
| 10,192,413 | B1 * | 1/2019 | Luski | G08B 13/1968 | |
| 10,814,833 | B1 * | 10/2020 | Goetzinger | B60R 25/23 | |
| 2002/0013138 | A1 * | 1/2002 | Benthin | B60R 11/0241 | 455/344 |
| 2006/0057984 | A1 * | 3/2006 | De Wilde | B60R 11/02 | 455/130 |

(Continued)

*Primary Examiner* — Curtis J King
(74) *Attorney, Agent, or Firm* — Reichel Story Dean LLP; Mark C. Reichel; Natalie J. Dean

(57) ABSTRACT

Devices, systems, and methods to reduce incidents of theft of multifunction displays (MFDs). The present disclosure includes disclosure of a cover for a MFD, comprising a panel configured to cover a MFD, and attachment means for securing the panel to the MFD, wherein when the panel is used to cover a MFD, removal of the panel from the MFD causes a signal to be transmitted from the panel to a receiver, the receiver configured to directly or indirectly alert a user that the panel has been removed from the MFD.

18 Claims, 11 Drawing Sheets

(56) References Cited

U.S. PATENT DOCUMENTS

| | | | | |
|---|---|---|---|---|
| 2006/0170549 | A1* | 8/2006 | Belden | G08B 13/1463<br>340/568.2 |
| 2013/0135118 | A1* | 5/2013 | Ricci | B60W 30/182<br>340/932.2 |
| 2013/0175905 | A1* | 7/2013 | Sanlaville | B60R 11/0205<br>312/7.1 |
| 2013/0241720 | A1* | 9/2013 | Ricci | B60K 35/00<br>715/765 |
| 2013/0245882 | A1* | 9/2013 | Ricci | G06F 3/0486<br>701/36 |
| 2015/0211264 | A1* | 7/2015 | Yang | H05K 5/0221<br>361/679.22 |
| 2016/0042620 | A1* | 2/2016 | Dandie | G06F 11/3013<br>340/568.3 |
| 2019/0272005 | A1* | 9/2019 | Wickett | G06F 1/1607 |
| 2023/0162581 | A1* | 5/2023 | Favier | B32B 7/12<br>340/572.8 |
| 2023/0298419 | A1* | 9/2023 | Buchhalter | G08B 25/008<br>340/539.1 |
| 2023/0332440 | A1* | 10/2023 | Fries | E05B 73/007 |

* cited by examiner

DEVICES, SYSTEMS, AND METHODS TO REDUCE INCIDENTS OF THEFT OF MULTIFUNCTION DISPLAYS

PRIORITY

The present application is related to, and claims the priority benefit of, U.S. provisional patent application Ser. No. 63/354,481, filed Jun. 22, 2022, the contents of which are incorporated herein directly and by reference in their entirety.

BRIEF SUMMARY

The present disclosure includes disclosure of devices, systems, and methods to reduce incidents of theft of multifunction displays (MFDs) from boats and other transportation means having the same.

The present disclosure includes disclosure of a cover for a multifunction display (MFD).

The present disclosure includes disclosure of a cover for a MFD that utilizes an alarm or signal when the cover is removed from the MFD.

The present disclosure includes disclosure of a cover for a MFD that is magnetically attracted to the MFD so to hold the cover in place. In at least one embodiment, when the cover is activated and when the cover is subsequently removed from the MFD, an alarm or signal is activated.

The present disclosure includes disclosure of a cover for a MFD that utilizes one or more sensors or contacts to form a circuit with the MFD. In at least one embodiment, when the cover is activated and when the cover is subsequently removed from the MFD, an alarm or signal is activated due to a change in status of the circuit.

The present disclosure includes disclosure of a cover for MFD that is configured to attach to the MFD using at least one of tape, hook and loop fasteners (such as Velcro®, for example), snaps, clips, flanges, etc., suitable for such a purpose.

The present disclosure includes disclosure of a cover for a MFD, comprising a panel configured to cover a MFD, and attachment means for securing the panel to the MFD, wherein when the panel is used to cover a MFD, removal of the panel from the MFD causes a signal to be transmitted from the panel to a receiver, the receiver configured to directly or indirectly alert a user that the panel has been removed from the MFD.

The present disclosure includes disclosure of a cover for a MFD, wherein the panel comprises a material selected from the group consisting of glass and plastic.

The present disclosure includes disclosure of a cover for a MFD, wherein the panel comprises a material selected from the group consisting of wood and metal.

The present disclosure includes disclosure of a cover for a MFD, wherein the attachment means comprise at least two magnets coupled to or embedded within the panel.

The present disclosure includes disclosure of a cover for a MFD, wherein each magnet of the at least two magnets are located at a relative corner of the panel.

The present disclosure includes disclosure of a cover for a MFD, wherein a circuit is formed between at least one magnet of the at least two magnets and the MFD.

The present disclosure includes disclosure of a cover for a MFD, wherein the circuit is formed when the panel is positioned upon the MFD, and wherein the circuit is broken when the panel is removed from the MFD.

The present disclosure includes disclosure of a cover for a MFD, wherein when the circuit is broken, the signal is sent from the panel to the receiver coupled to or otherwise in communication with a device selected from the group consisting of an alarm, a siren, a speaker, and a transmitter.

The present disclosure includes disclosure of a cover for a MFD, wherein the attachment means comprise one magnet coupled to or embedded within the panel.

The present disclosure includes disclosure of a cover for a MFD, wherein a circuit is formed between the one magnet and the MFD.

The present disclosure includes disclosure of a cover for a MFD, wherein the circuit is formed when the panel is positioned upon the MFD, and wherein the circuit is broken when the panel is removed from the MFD.

The present disclosure includes disclosure of a cover for a MFD, wherein when the circuit is broken, the signal is sent from the panel to the receiver coupled to a device selected from the group consisting of an alarm, a siren, a speaker, and a transmitter.

The present disclosure includes disclosure of a cover for a MFD, further comprising a processor coupled to the attachment means, the processor powered by a battery coupled thereto.

The present disclosure includes disclosure of a cover for a MFD, wherein the attachment means comprises at least one fastener selected from the group consisting of a hook and loop fastener, a snap, a clip, tape, and a flange.

The present disclosure includes disclosure of a cover for a MFD, further comprising one or more sensors or contacts coupled to or embedded within the panel, said one or more sensors or contacts configured to form a circuit with the MFD.

The present disclosure includes disclosure of a cover for a MFD, wherein the circuit is formed when the panel is positioned upon the MFD, and wherein the circuit is broken when the panel is removed from the MFD.

The present disclosure includes disclosure of a cover for a MFD, wherein when the circuit is broken, the signal is sent from the panel to the receiver coupled to or otherwise in communication with a device selected from the group consisting of an alarm, a siren, a speaker, and a transmitter.

The present disclosure includes disclosure of a cover for a MFD, wherein when the cover is activated and wherein when the cover is subsequently removed from the MFD, an alarm or signal is activated due to a change in status of a circuit formed between the panel and the MFD.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

Figure 1:
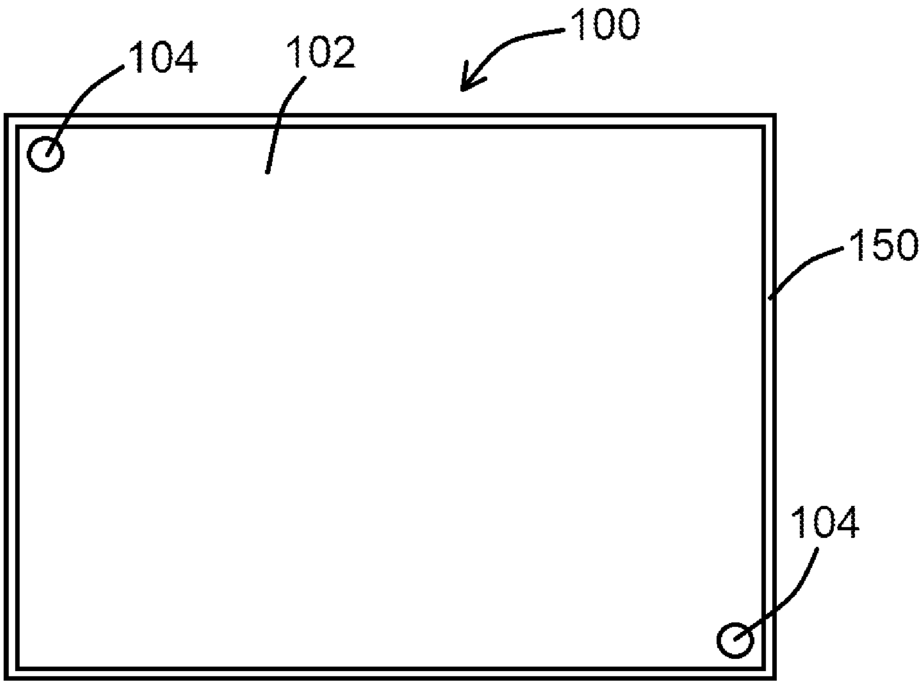
FIG. 1 shows a front view of a cover positioned upon a multifunction display (MFD), said cover having two magnets in first exemplary positions, according to an exemplary embodiment of the present disclosure.

As such, an overview of the features, functions and/or configurations of the components depicted in the various figures will now be presented. It should be appreciated that not all of the features of the components of the figures are necessarily described and some of these non-discussed features (as well as discussed features) are inherent from the figures themselves. Other non-discussed features may be inherent in component geometry and/or configuration. Furthermore, wherever feasible and convenient, like reference numerals are used in the figures and the description to refer to the same or like parts or steps. The figures are in a simplified form and not to precise scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

An exemplary device of the present disclosure is shown in FIG. 1. As shown therein, cover 100 comprises a panel 102 configured to cover a MFD 150. Panels 102 of the present disclosure can comprise any number of materials, including, but not limited to, traditional glass, tempered glass, plastic, wood, metal, and the like.

Figure 2:
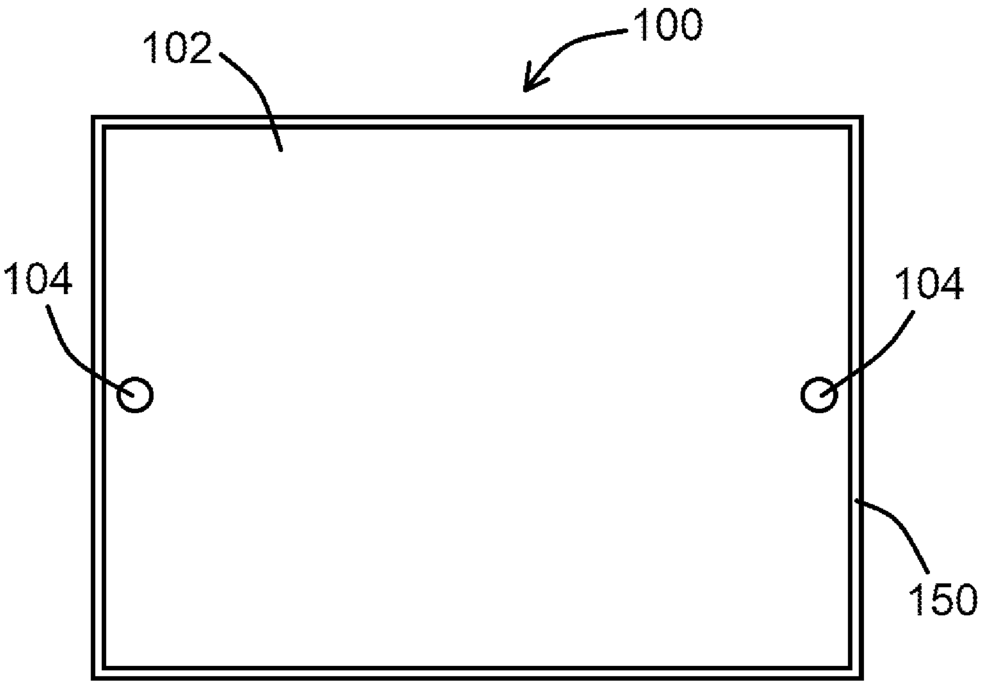
FIG. 2 shows a front view of a cover positioned upon a MFD, said cover having two magnets in second exemplary positions, according to an exemplary embodiment of the present disclosure.
Figure 3A:
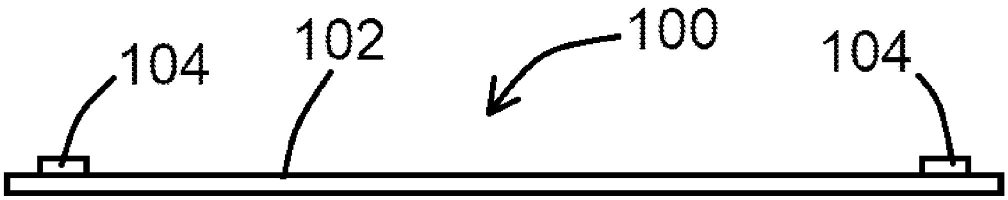
FIG. 3A shows a side view of a cover having two magnets positioned thereon, according to an exemplary embodiment of the present disclosure.
Figure 3B:
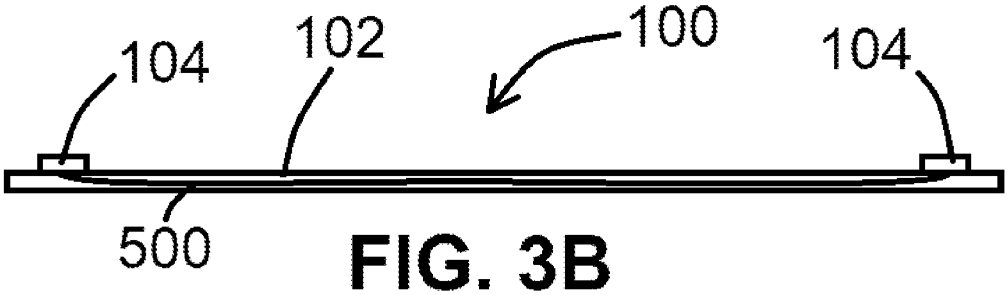
FIG. 3B shows a side view of a cover having two magnets positioned thereon and a wire connecting the two magnets to one another, according to an exemplary embodiment of the present disclosure.
Figure 4A:
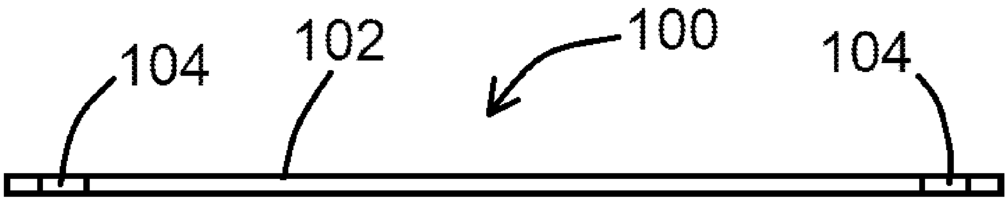
FIG. 4A shows a side view of a cover having two magnets positioned therein, according to an exemplary embodiment of the present disclosure.
Figure 4B:
FIG. 4B shows a side view of a cover having two magnets positioned therein and a wire connecting the two magnets to one another, according to an exemplary embodiment of the present disclosure.
Figure 5:
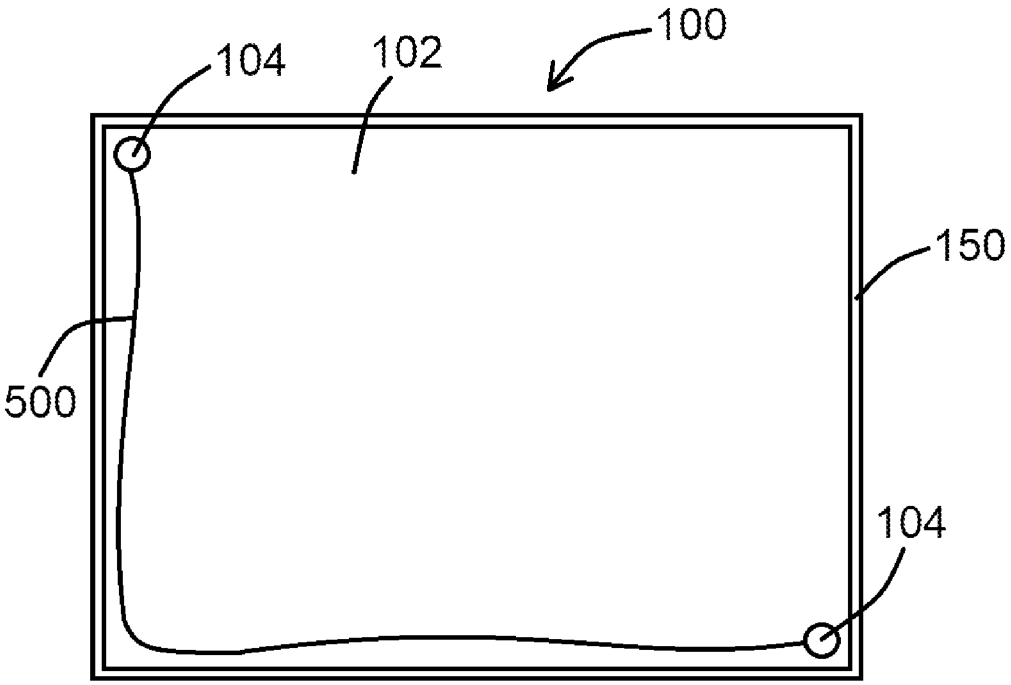
FIG. 5 shows a front view of a cover positioned upon a MFD, said cover having two magnets in first exemplary positions connected to one another using a wire, according to an exemplary embodiment of the present disclosure.
Figure 6:
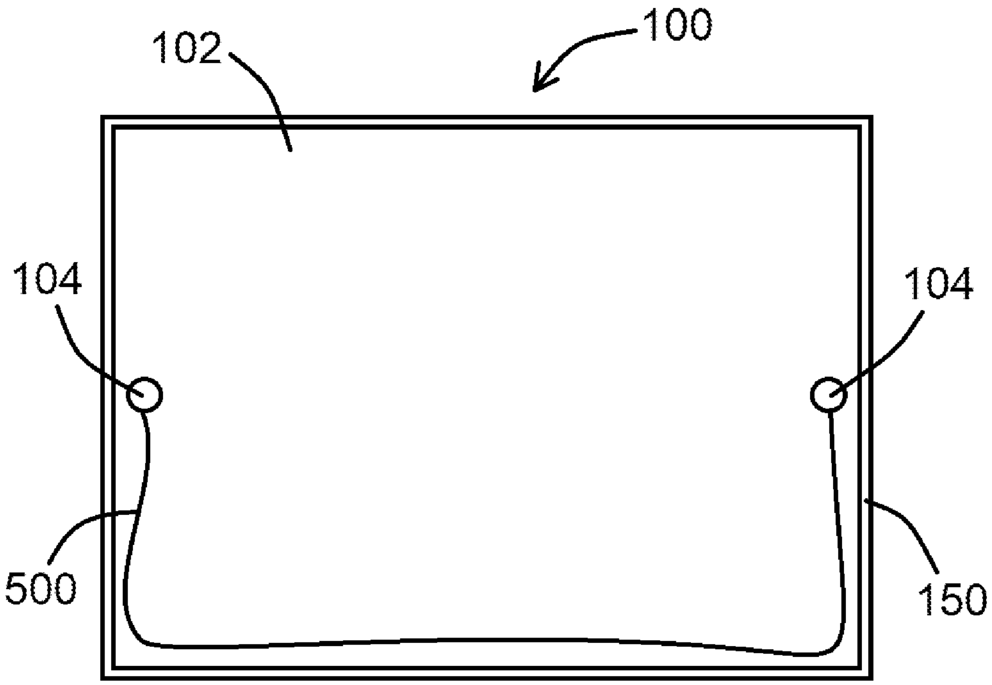
FIG. 6 shows a front view of a cover positioned upon a MFD, said cover having two magnets in second exemplary positions connected to one another using a wire, according to an exemplary embodiment of the present disclosure.

In various embodiments, covers 100 of the present disclosure are configured to attach to MFDs 150 by way of at least two magnets 104, such as positioned at locations around a perimeter of panels 102, or by way of another mechanism, such as the use of one or more other types of fasteners 1102, as discussed in further detail herein. In at least one embodiment of a cover 100 that utilizes magnets 104, and as shown in FIG. 1, an exemplary cover 100 of the present disclosure comprises two magnets 104 positioned at opposite corners of panel 102, such as between panel 102 and MFD 150 (as shown in FIGS. 3A and 3B), or embedded into panel 102 itself (as shown in FIGS. 4A and 4B). Magnets 104 can be positioned at other locations than the relative corners, such as at relative sides of the perimeter of an exemplary panel 102, such as shown in FIG. 2.

The use of two or more magnets 104 allows for a general circuit to be made between cover 100 and MFD 150 using said magnets 104. In at least one embodiment, said circuit is a wireless circuit, such as shown in FIGS. 1 and 2, and in other embodiments, such as shown in FIGS. 3B, 4B, 5, and 6, a conductive wire 500 can be used to physically connect two magnets 104, forming a wired circuit between said magnets 104. Magnets 104 would therefore be configured to and positioned upon or within said covers 100 in locations that correspond to magnetically attractive portions of MFDs 150, such as magnetically attractive metals and/or corresponding magnets.

Figure 10:
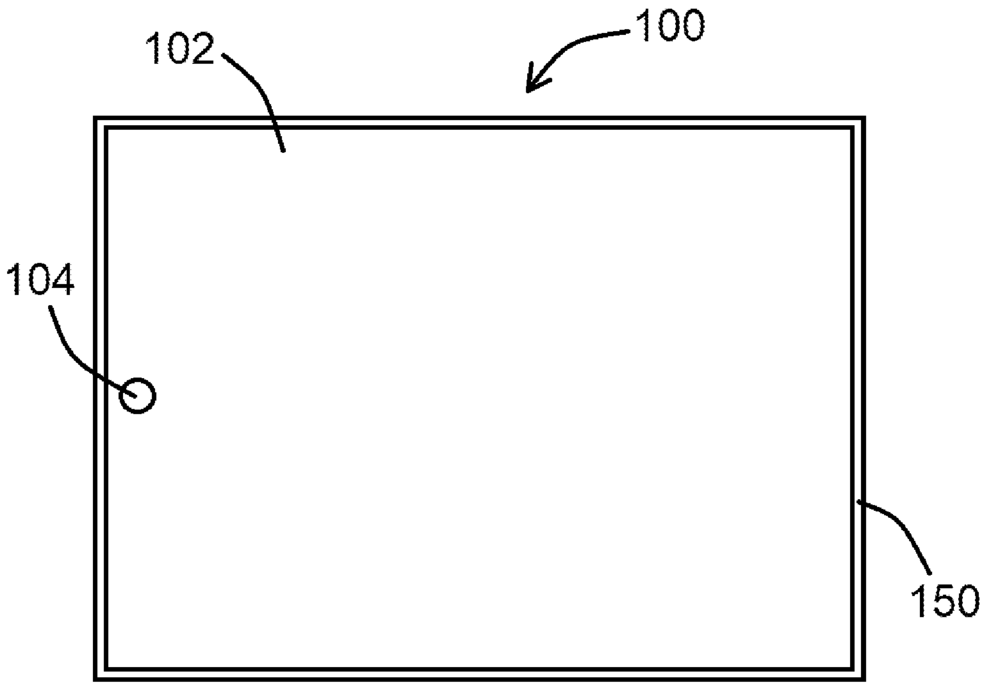
FIG. 10 shows a front view of a cover positioned upon a MFD, said cover having one magnet in a first exemplary position, according to an exemplary embodiment of the present disclosure.

An additional embodiment of an exemplary cover 100 of the present disclosure is shown in FIG. 10. In such an embodiment, cover 100 comprises a single magnet 104, whereby said single magnet 104 forms a general circuit with MFD 150.

In cover 100 embodiments of the present disclosure, and when a cover 100 of the present disclosure is positioned upon a MFD 150, a circuit is formed between at least one of the two magnets 104 and the MFD 150 itself, so that if a cover 100 is operably "on," removal of cover 100 from MFD 150, and or breaking of a wired contact via breaking or disconnecting conductive wire 500, would cause the circuit to break, whereby the broken circuit can be used to trigger an alarm or notification of potential theft of the same, as discussed in further detail herein.

Figure 8:
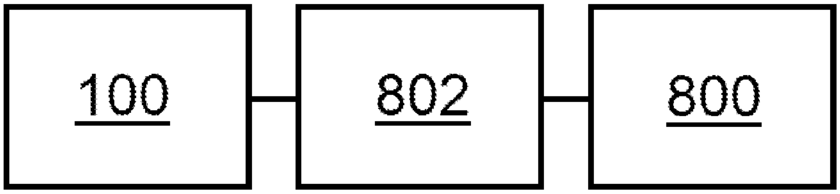
FIG. 8 shows a block diagram of an exemplary cover configured to communicate with an alarm, siren, or speaker, according to an exemplary embodiment of the present disclosure.

Cover 100 embodiments are configured to create some sort of signal or alert when a created circuit has been broken, such as when cover 100 is removed from MFD 150, causing magnets 104 to lose contact with MFD 150. Via wired or wireless transmission, covers 100 of the present disclosure can be configured to trigger an alarm when cover 100 is removed from MFD 150. In at least one embodiment, breaking the circuit (removing cover 100 from MFD 150) causes a signal to be sent from cover 100 directly to a receiver 802 coupled to or formed as part of an alarm, siren, or speaker 800, such as shown in FIG. 8.

Figure 7:
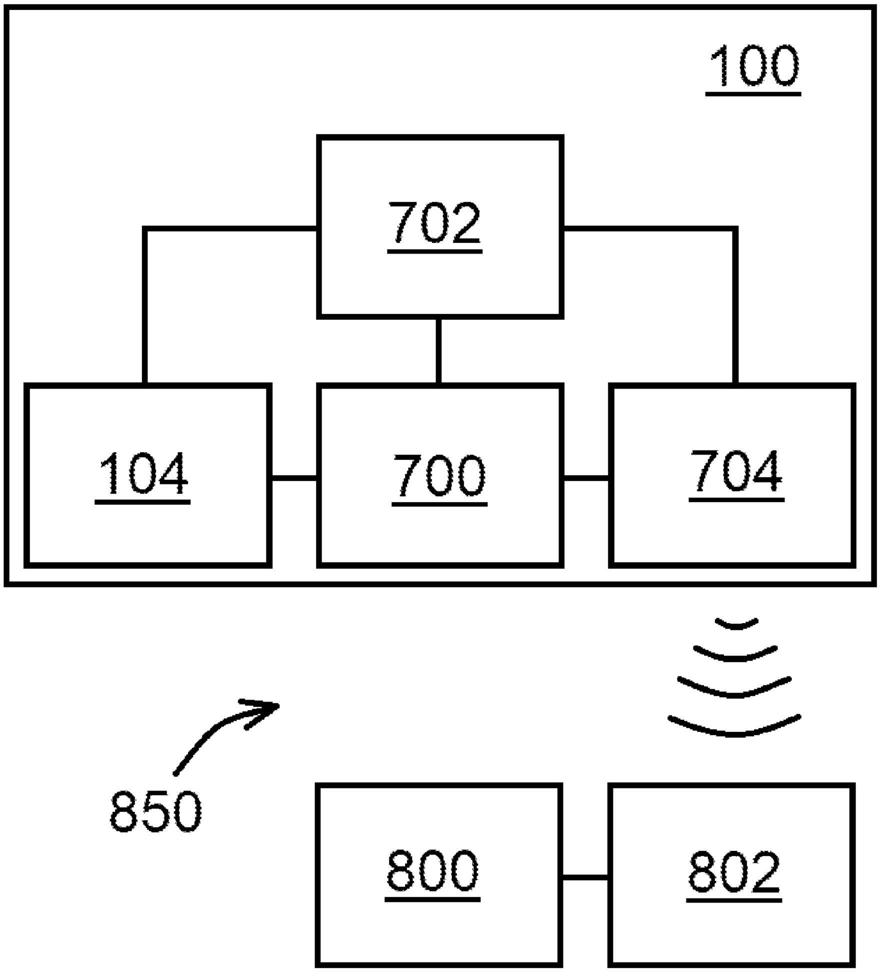
FIG. 7 shows a block diagram of components of an exemplary cover configured to communicate with an alarm, siren, or speaker, according to an exemplary embodiment of the present disclosure.

For example, and as shown in the block diagram in FIG. 7, an exemplary cover 100 can comprise a magnet 104 coupled to a processor 700, said processor 700 powered by a battery 702 that also powers a transmitter 704. Battery 702 can also be coupled to magnet 104 so that a property of the magnet changes and is detectable by processor 700 when magnet 104 forming a circuit has its circuit broken (such as due to removal of cover 100 from MFD 150). Upon said detection, processor 700 can instruct transmitter 704 to transmit a signal receivable by a remote receiver 802 in operable communication with an alarm, siren, or speaker 800, so to activate the same. Activation of said alarm, siren, or speaker 800 would alert the immediate vicinity of the boat or other transportation means having said MFDs 150 that a potential MFD theft is occurring. An exemplary cover 100 plus another remote item, such as a remote receiver 802, alarm, siren, or speaker 800, remote light 900, etc., could comprise an exemplary system 850 of the present disclosure, such as shown in FIG. 8.

Figure 9:
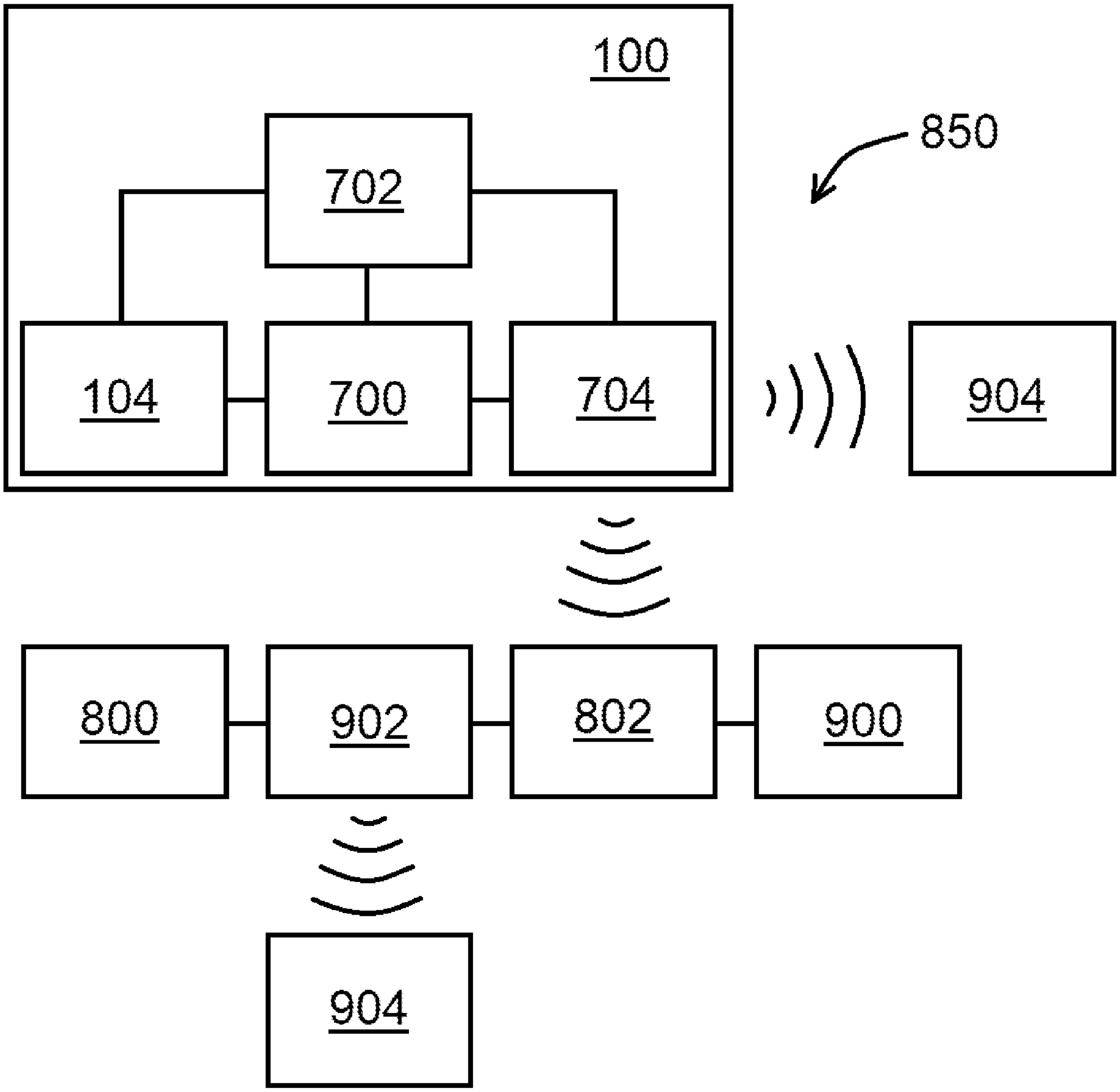
FIG. 9 shows a block diagram of components of a system comprising an exemplary cover configured to communicate with an alarm, siren, or speaker, according to an exemplary embodiment of the present disclosure.

Another block diagram of a system 850 of the present disclosure is shown in FIG. 9. As shown therein, an exemplary cover 100 can comprise a magnet 104 coupled to a processor 700, said processor 700 powered by a battery 702 that also powers a transmitter 704. Battery 702 can also be coupled to magnet 104 so that a property of the magnet changes and is detectable by processor 700 when magnet 104 forming a circuit has its circuit broken (such as due to removal of cover 100 from MFD 150). Upon said detection, processor 700 can instruct transmitter 704 to transmit a signal receivable by a remote receiver 802 in operable communication with an alarm, siren, or speaker 800 and/or a remote light 900, so to activate the same. Furthermore, and in various embodiments, receiver 802 can be coupled to a remote transmitter 902, such as shown in FIG. 9, whereby said remote transmitter 902 is configured to send a signal, such as a wireless telephone signal, a Wi-Fi signal, a Bluetooth signal, etc., to a handheld device 904, such as, for example, a cellular telephone, a tablet, a traditional telephone, a pager, a smartwatch, etc., so to alert a person that someone may be attempting to steal a MFD 150. In at least one embodiment, and such as shown in FIG. 9, transmitter 704 is itself configured to send a signal, such as a wireless telephone signal, a Wi-Fi signal, a Bluetooth signal, etc., to a handheld device 904. Activation of said alarm, siren, or speaker 800, and/or light 900 would alert the immediate vicinity of the boat or other transportation means having said MFDs 150 that a potential MFD theft is occurring, while a signal sent to a handheld device 904 can alert a user of said handheld device 904, regardless of geographic location, that a potential MFD 150 theft is occurring. Said signals can be received via a smartphone or tablet app, a local police station telephone, a cellular telephone, etc., to put people on alert regarding a potential theft.

Covers 100 of the present disclosure can be transparent, semi-transparent, translucent, or opaque, as may be desired. Transparent covers 100 may be preferred in situations whereby said covers 100 remain positioned upon MFDs 150 while MFDs are actively being used. Other embodiments may be preferred when said covers 100 are positioned upon MFDs 150 when said MFDs 150 are not being actively used.

Figure 11:
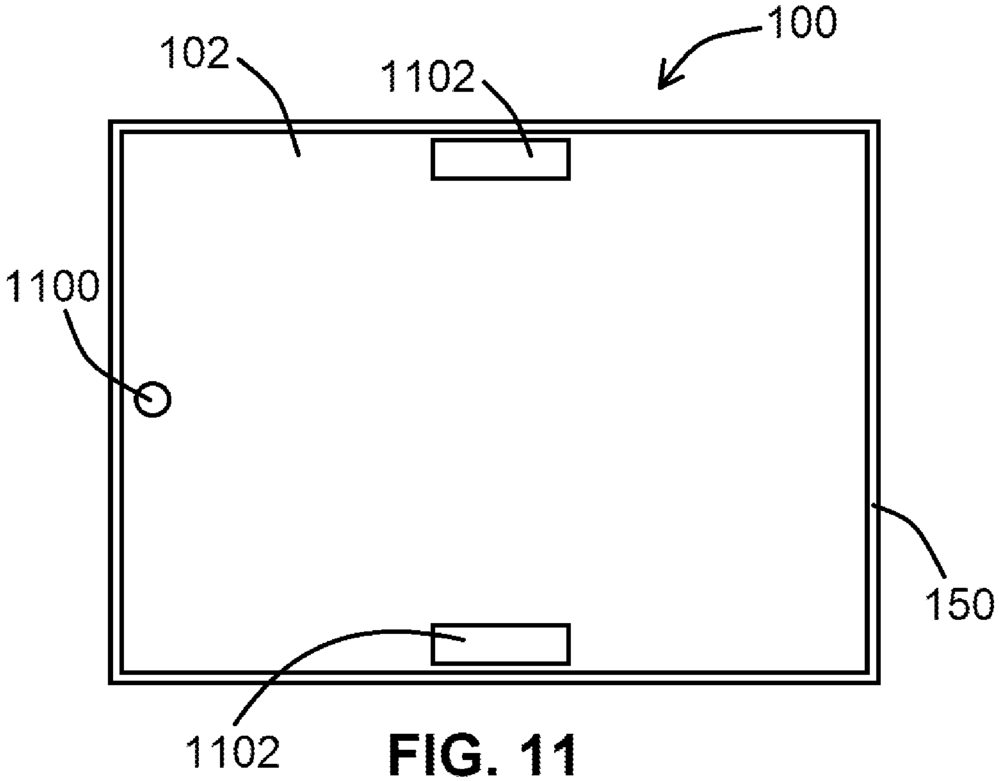
FIG. 11 shows a front view of a cover positioned upon a MFD, said cover having one sensor or contact in a first exemplary position and two fasteners in first exemplary positions, according to an exemplary embodiment of the present disclosure.

In other embodiments of the present disclosure, covers 100 do not utilize magnets 104, but instead utilize one or more sensors or contacts 1100, such as shown in FIG. 11. Said sensors or contacts 1100 would therefore be configured to form a general circuit along with MFD 150, such that when cover 100 is removed from MFD 150, a signal or alert can be created as referenced herein. Covers 100, in such embodiments, would then need some other mechanism to remain positioned upon MFDs 150, such as, for example, one or more fasteners 1102, which can include, but are not limited to, tape, hook and loop fasteners (such as Velcro®, for example), snaps, clips, flanges, etc., suitable for such a purpose.

Sensors or contacts 1100, in various cover 100 embodiments, would therefore be configured to and positioned upon or within said covers 100 in locations that correspond to contact points of MFDs 150, so that when an exemplary cover 100 is positioned upon a MFD 150, sensors or contacts 1100 align with contact points of MFD 150 so to create a general circuit, while one or more fasteners 1102 are used to retain cover 100 in place relative to MFD 150. In embodiments whereby sensors or contacts 1100 are used to form a general circuit, one or more magnets 104 can be used as exemplary fasteners 1102, whereby said magnets 104 are not used to form a general circuit.

Figure 12:
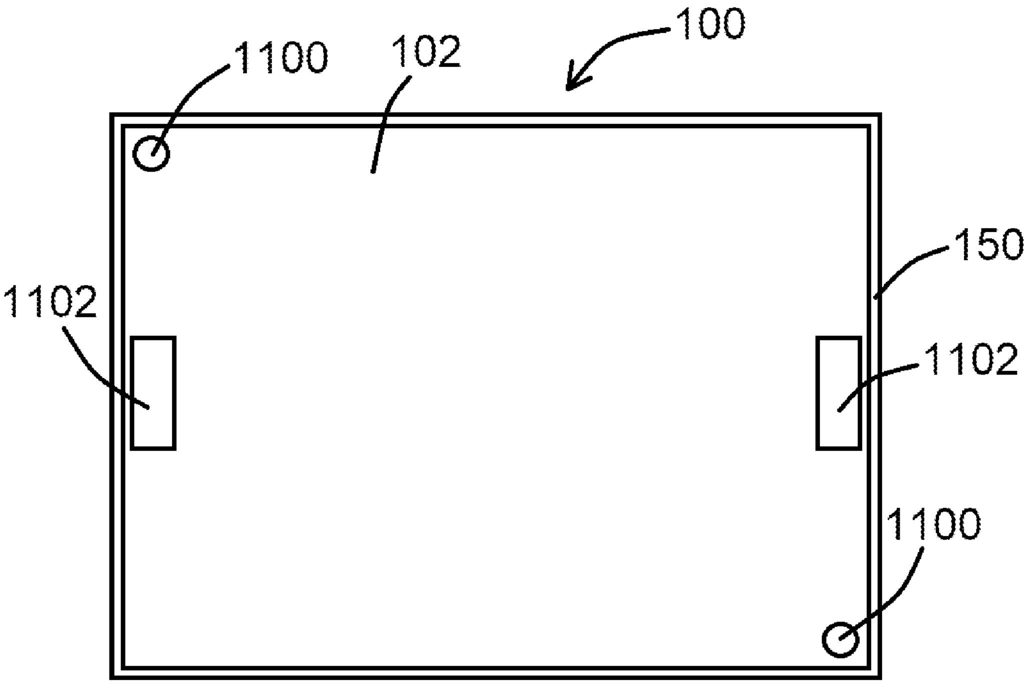
FIG. 12 shows a front view of a cover positioned upon a MFD, said cover having two sensors or contacts in first exemplary positions and two fasteners in second exemplary positions, according to an exemplary embodiment of the present disclosure.
Figure 13:
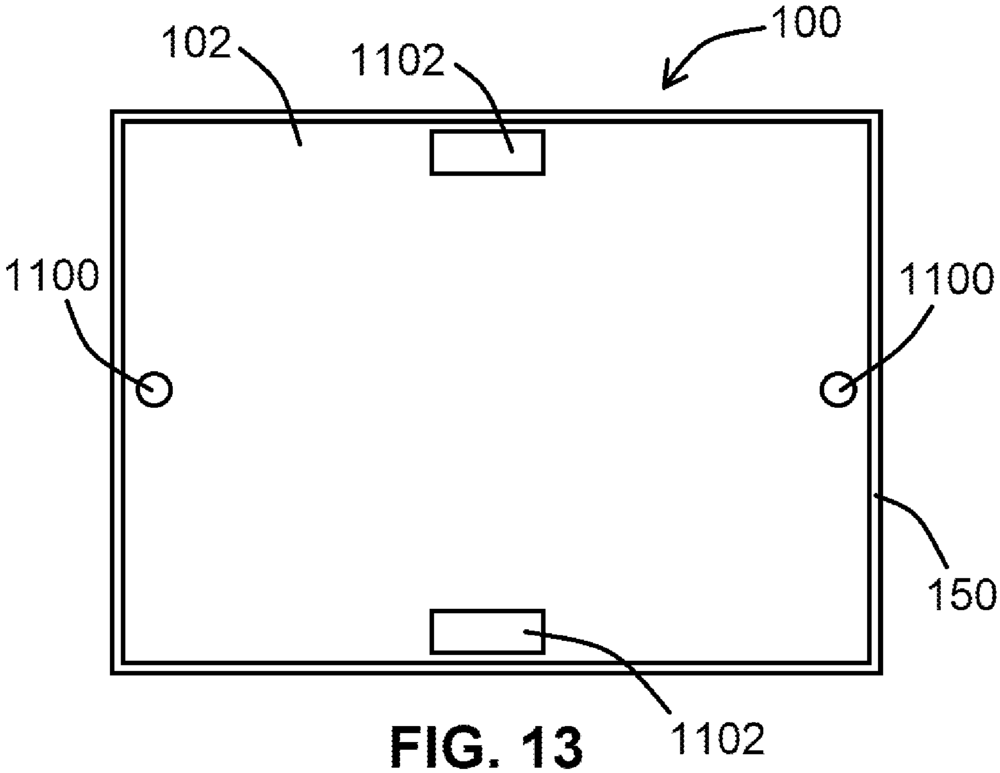
FIG. 13 shows a front view of a cover positioned upon a MFD, said cover having two sensors or contacts in second exemplary positions and two fasteners in first exemplary positions, according to an exemplary embodiment of the present disclosure.
Figure 14A:
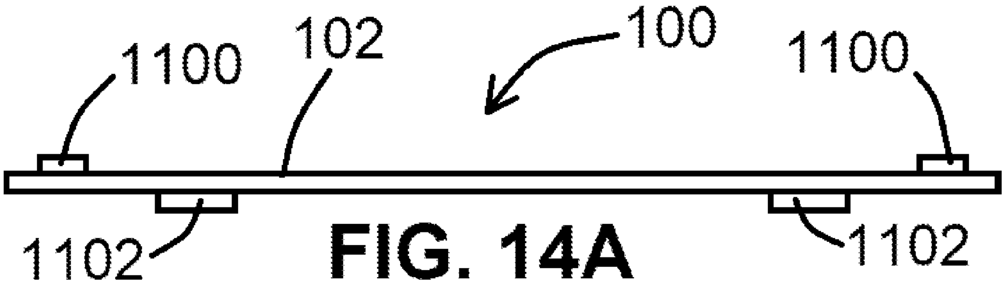
FIG. 14A shows a side view of a cover having two sensors or contacts positioned thereon, according to an exemplary embodiment of the present disclosure.
Figure 14B:
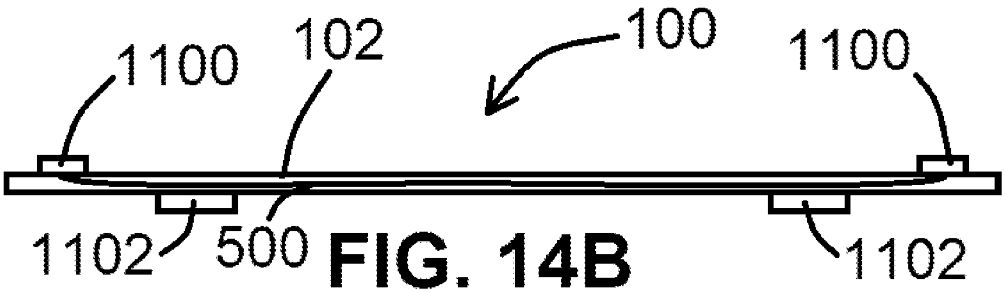
FIG. 14B shows a side view of a cover having two sensors or contacts positioned thereon and a wire connecting the two sensors or contacts to one another, according to an exemplary embodiment of the present disclosure.
Figure 15A:
FIG. 15A shows a side view of a cover having two sensors or contacts positioned therein, according to an exemplary embodiment of the present disclosure.
Figure 15B:
FIG. 15B shows a side view of a cover having two sensors or contacts positioned therein and a wire connecting the two sensors or contacts to one another, according to an exemplary embodiment of the present disclosure.
Figure 16:
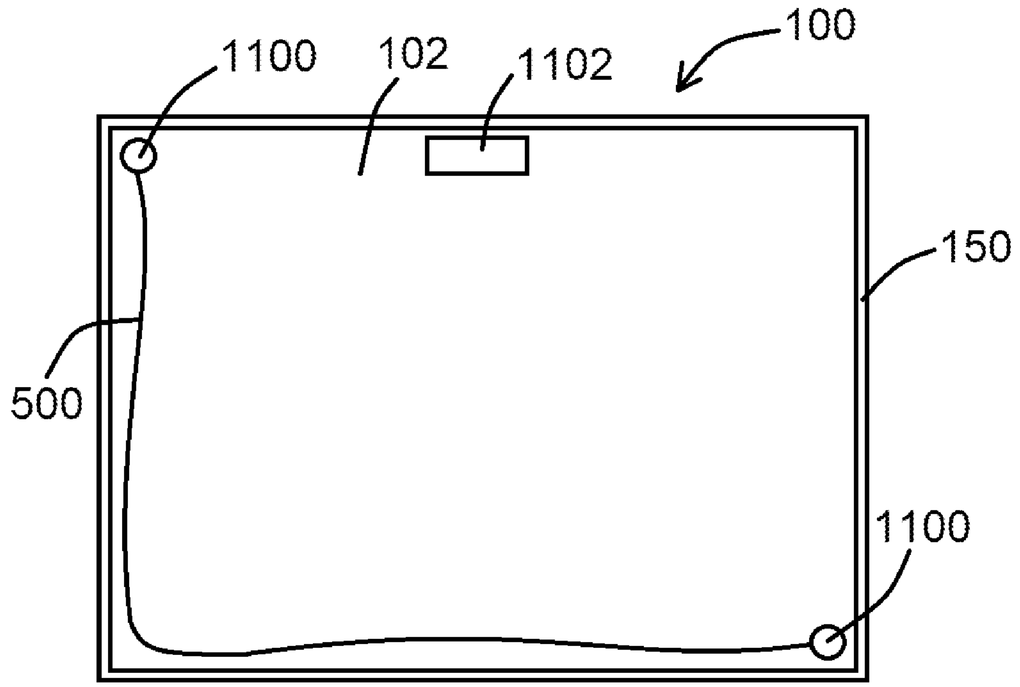
FIG. 16 shows a front view of a cover positioned upon a MFD, said cover having two sensors or contacts in first exemplary positions connected to one another using a wire, according to an exemplary embodiment of the present disclosure.
Figure 17:
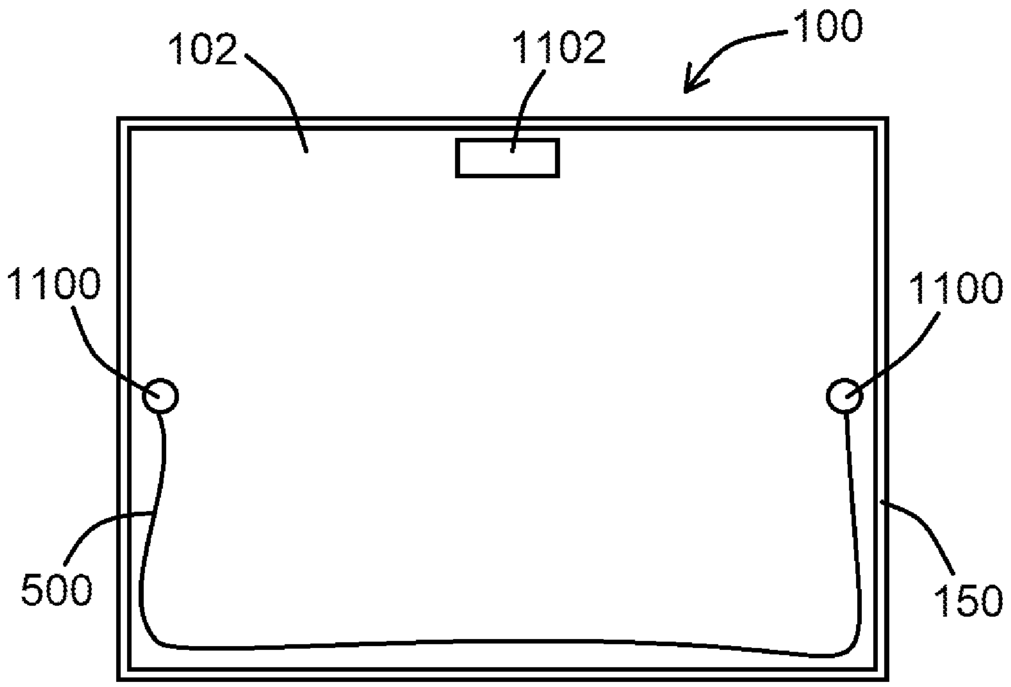
FIG. 17 shows a front view of a cover positioned upon a MFD, said cover having two sensors or contacts in second exemplary positions connected to one another using a wire, according to an exemplary embodiment of the present disclosure.

The use of one or more sensors or contacts 1100 allows for a general circuit to be made between cover 100 and MFD 150. In at least one embodiment, said circuit is a wireless circuit, such as shown in FIGS. 12 and 13, and in other embodiments, such as shown in FIGS. 14B, 15B, 16, and 17, a conductive wire 500 can be used to physically connect two sensors or contacts 1100, forming a wired circuit between said sensors or contacts 1100.

In cover 100 embodiments of the present disclosure, and when a cover 100 of the present disclosure is positioned upon a MFD 150, a circuit is formed between at least one sensor or contact 1100 and the MFD 150 itself, so that if a cover 100 is operably "on," removal of cover 100 from MFD 150, and or breaking of a wired contact via breaking or disconnecting conductive wire 500, would cause the circuit to break, whereby the broken circuit can be used to trigger an alarm or notification of potential theft of the same, as discussed in further detail herein.

Figure 19:
FIG. 19 shows a block diagram of an exemplary cover configured to communicate with an alarm, siren, or speaker, according to an exemplary embodiment of the present disclosure.

Cover 100 embodiments are configured to create some sort of signal or alert when a created circuit has been broken, such as when cover 100 is removed from MFD 150, causing the one or more sensors or contacts 1100 to lose contact with MFD 150. Via wired or wireless transmission, covers 100 of the present disclosure can be configured to trigger an alarm when cover 100 is removed from MFD 150. In at least one embodiment, breaking the circuit (removing cover 100 from MFD 150) causes a signal to be sent from cover 100 directly to a receiver 802 coupled to or formed as part of an alarm, siren, or speaker 800, such as shown in FIG. 19.

Figure 18:
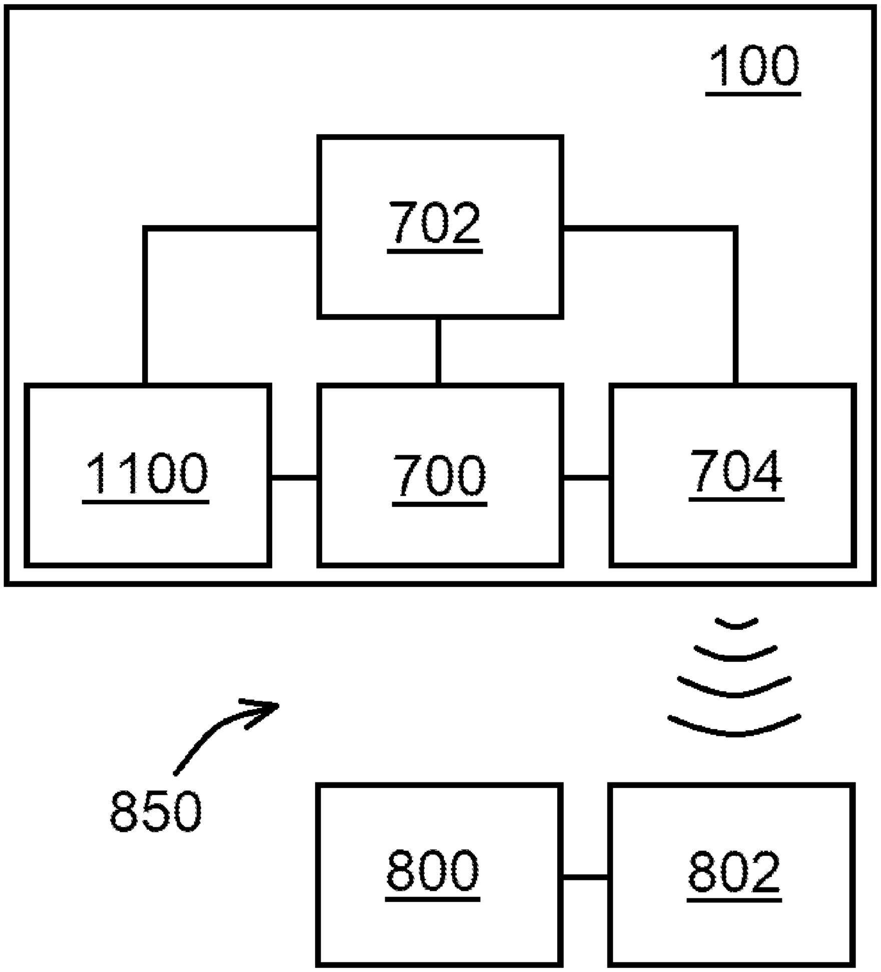
FIG. 18 shows a block diagram of components of an exemplary cover configured to communicate with an alarm, siren, or speaker, according to an exemplary embodiment of the present disclosure.

For example, and as shown in the block diagram in FIG. 18, an exemplary cover 100 can comprise one or more sensors 1100 coupled to a processor 700, said processor 700 powered by a battery 702 that also powers a transmitter 704. Battery 702 can also be coupled to said one or more sensors 1100 so that removal of one or more sensors 1100 of cover 100 from MFD 150 is detectable by processor 700 that its circuit has broken. Upon said detection, processor 700 can instruct transmitter 704 to transmit a signal receivable by a remote receiver 802 in operable communication with an alarm, siren, or speaker 800, so to activate the same. Activation of said alarm, siren, or speaker 800 would alert the immediate vicinity of the boat or other transportation means having said MFDs 150 that a potential MFD theft is occurring. An exemplary cover 100 plus another remote item, such as a remote receiver 802, alarm, siren, or speaker 800, remote light 900, etc., could comprise an exemplary system 850 of the present disclosure, such as shown in FIG. 8.

Figure 20:
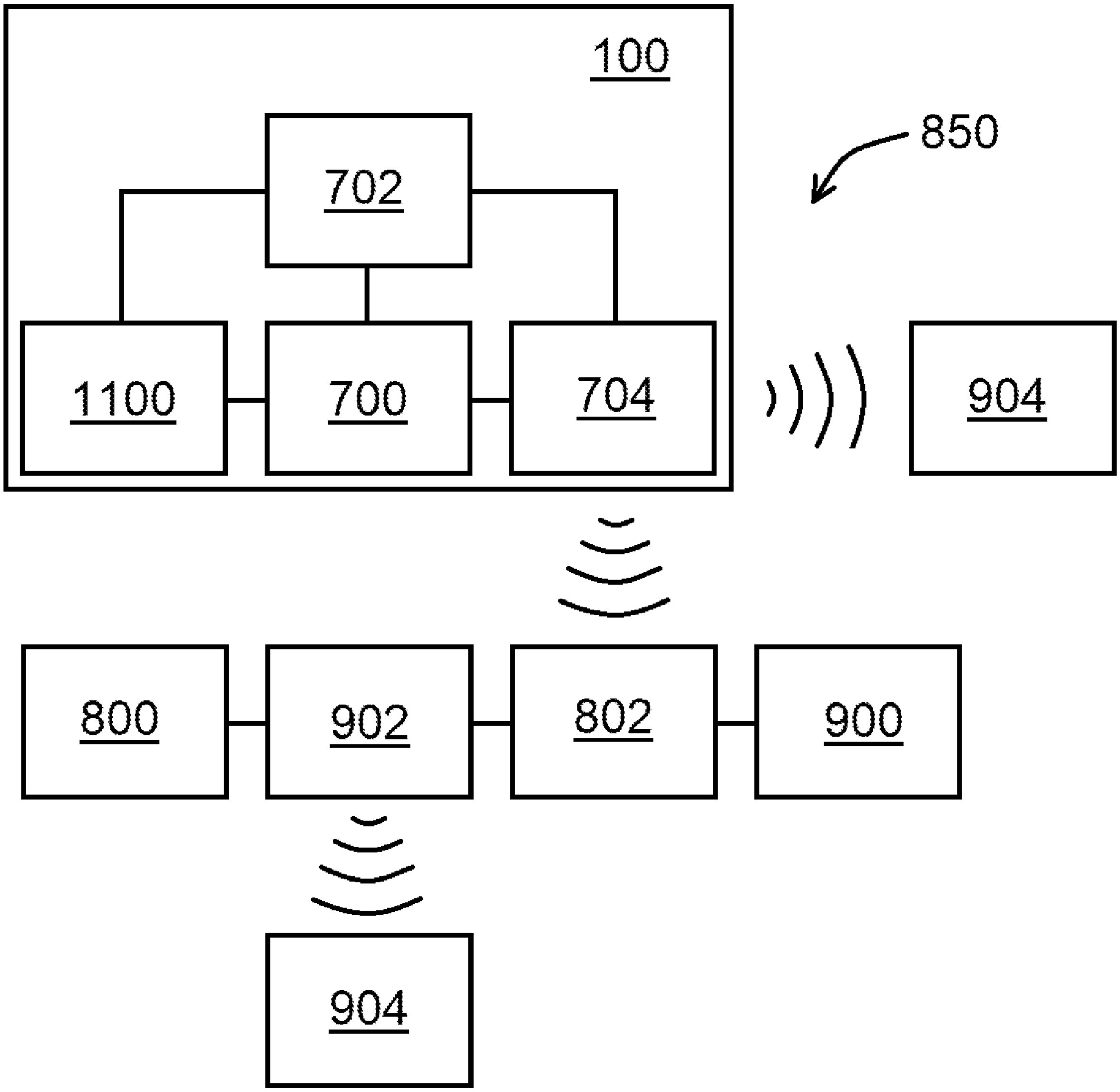
FIG. 20 shows a block diagram of components of a system comprising an exemplary cover configured to communicate with an alarm, siren, or speaker, according to an exemplary embodiment of the present disclosure.

Another block diagram of a system 850 of the present disclosure is shown in FIG. 20. As shown therein, an exemplary cover 100 can comprise one or more sensors or contacts 1100 coupled to a processor 700, said processor 700 powered by a battery 702 that also powers a transmitter 704. Battery 702 can also be coupled to said one or more sensors 1100 so that removal of one or more sensors 1100 of cover 100 from MFD 150 is detectable by processor 700 that its circuit has broken. Upon said detection, processor 700 can instruct transmitter 704 to transmit a signal receivable by a remote receiver 802 in operable communication with an alarm, siren, or speaker 800 and/or a remote light 900, so to activate the same. Furthermore, and in various embodiments, receiver 802 can be coupled to a remote transmitter 902, such as shown in FIG. 9, whereby said remote transmitter 902 is configured to send a signal, such as a wireless telephone signal, a Wi-Fi signal, a Bluetooth signal, etc., to a handheld device 904, such as, for example, a cellular telephone, a tablet, a traditional telephone, a pager, a smartwatch, etc., so to alert a person that someone may be attempting to steal a MFD 150. In at least one embodiment, and such as shown in FIG. 9, transmitter 704 is itself configured to send a signal, such as a wireless telephone signal, a Wi-Fi signal, a Bluetooth signal, etc., to a handheld device 904. Activation of said alarm, siren, or speaker 800, and/or light 900 would alert the immediate vicinity of the boat or other transportation means having said MFDs 150 that a potential MFD 150 theft is occurring, while a signal sent to a handheld device 904 can alert a user of said handheld device 904, regardless of geographic location, that a potential MFD 150 theft is occurring. Said signals can be received via a smartphone or tablet app, a local police station telephone, a cellular telephone, etc., to put people on alert regarding a potential theft.

In view of the same, and in at least one embodiment, a cover 100 of the present disclosure could comprise a single sensor or contact 1100 that can protect a MFD 150 from access and/or removal.

While various embodiments of devices, systems, and methods of using the same have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A cover for a multifunction display (MFD), comprising:
a panel configured to cover a MFD; and
attachment means for securing the panel to the MFD;
wherein when the panel is used to cover a MFD, removal of the panel from the MFD causes a signal to be transmitted from the panel to a receiver, the receiver configured to directly or indirectly alert a user that the panel has been removed from the MFD.

2. The cover of claim 1, wherein the panel comprises a material selected from the group consisting of glass and plastic.

3. The cover of claim 1, wherein the panel comprises a material selected from the group consisting of wood and metal.

4. The cover of claim 1, wherein the attachment means comprise at least two magnets coupled to or embedded within the panel.

5. The cover of claim 4, wherein each magnet of the at least two magnets are located at a relative corner of the panel.

6. The cover of claim 4, wherein a circuit is formed between at least one magnet of the at least two magnets and the MFD.

7. The cover of claim 6, wherein the circuit is formed when the panel is positioned upon the MFD, and wherein the circuit is broken when the panel is removed from the MFD.

8. The cover of claim 7, wherein when the circuit is broken, the signal is sent from the panel to the receiver coupled to or otherwise in communication with a device selected from the group consisting of an alarm, a siren, a speaker, and a transmitter.

9. The cover of claim 1, wherein the attachment means comprise one magnet coupled to or embedded within the panel.

10. The cover of claim 9, wherein a circuit is formed between the one magnet and the MFD.

11. The cover of claim 10, wherein the circuit is formed when the panel is positioned upon the MFD, and wherein the circuit is broken when the panel is removed from the MFD.

12. The cover of claim 11, wherein when the circuit is broken, the signal is sent from the panel to the receiver coupled to a device selected from the group consisting of an alarm, a siren, a speaker, and a transmitter.

13. The cover of claim 1, further comprising:

a processor coupled to the attachment means, the processor powered by a battery coupled thereto.

14. The cover of claim 1, wherein the attachment means comprises at least one fastener selected from the group consisting of a hook and loop fastener, a snap, a clip, tape, and a flange.

15. The cover of claim 14, further comprising:

one or more sensors or contacts coupled to or embedded within the panel, said one or more sensors or contacts configured to form a circuit with the MFD.

16. The cover of claim 15, wherein the circuit is formed when the panel is positioned upon the MFD, and wherein the circuit is broken when the panel is removed from the MFD.

17. The cover of claim 16, wherein when the circuit is broken, the signal is sent from the panel to the receiver coupled to or otherwise in communication with a device selected from the group consisting of an alarm, a siren, a speaker, and a transmitter.

18. The cover of claim 1, wherein when the cover is activated and wherein when the cover is subsequently removed from the MFD, an alarm or signal is activated due to a change in status of a circuit formed between the panel and the MFD.

* * * * *